United States Patent [19]

Lin et al.

[11] Patent Number: 4,750,124

[45] Date of Patent: Jun. 7, 1988

[54] ANTI-LOCK BRAKE CONTROL SYSTEM

[75] Inventors: William C. W. Lin, Troy; Shahram Zarei, Utica, both of Mich.

[73] Assignee: General Motors Corporation, Detroit, Mich.

[21] Appl. No.: 932,401

[22] Filed: Nov. 19, 1986

[51] Int. Cl.[4] ............................................. B60T 8/58
[52] U.S. Cl. ..................................... 369/426; 303/97; 303/100; 303/DIG. 4
[58] Field of Search ................ 364/426, 566; 180/197; 303/100, 104, 110, 111, 112, 97, DIG. 4

[56] References Cited

U.S. PATENT DOCUMENTS

| 4,094,555 | 6/1978 | Byrne et al. | 303/100 |
| 4,491,919 | 1/1985 | Leiber | 364/426 |
| 4,653,816 | 3/1987 | Lin | 364/426 |
| 4,664,453 | 5/1987 | Kade et al. | 303/104 |

*Primary Examiner*—Gary Chin
*Attorney, Agent, or Firm*—Howard N. Conkey

[57] ABSTRACT

A wheel lock control system is described for a wheel braking system in which the brake pressure producing the critical slip value and therefore the peak braking effort is precisely determined. The brake pressure that is reapplied following an incipient wheel lockup condition is determined as a function of (A) the brake pressure and wheel deceleration corresponding in time to the peak calculated tire torque tending to accelerate the wheel during braking prior to the detection of an incipient wheel lockup condition and (B) the brake pressure and wheel acceleration corresponding in time to the peak calculated tire torque tending to accelerate the wheel during wheel speed recovery following an incipient wheel lockup condition. By using these parameters, the precise brake pressure for establishing the critical wheel slip is determined so that the maximum braking effort may be established following a detected incipient lockup condition.

4 Claims, 6 Drawing Sheets

ANTI-LOCK BRAKE CONTROL SYSTEM

BACKGROUND OF THE INVENTION

This invention relates to an anti-lock control system for vehicle wheel brakes in which the reapply pressure following an incipient wheel lockup condition is based on the brake pressure and wheel deceleration corresponding in time to the maximum tire torque tending to accelerate the wheel prior to the lockup condition and the brake pressure and wheel acceleration corresponding in time to the maximum tire torque tending to accelerate the wheel during wheel speed recovery following the lockup condition.

When the brakes of a vehicle are applied, a braking force between the wheel and the road surface is generated that is dependent upon various parameters including the road surface condition and the amount of slip between the wheel and the road surface. For a given road surface, the force between the wheel and the road surface increases with increasing slip values to a peak force occurring at a critical wheel slip value. As the value of wheel slip increases beyond the critical slip value, the force between the wheel and the road surface decreases. Stable braking results when the slip value is equal to or less than the critical slip value. However, when the slip value becomes greater than the critical slip value, braking becomes unstable resulting in sudden wheel lockup, reducing vehicle stopping distance and deterioration in the lateral stability of the vehicle.

U.S. application Ser. No. 789,576 filed on Oct. 21, 1985, now U.S. Pat. No. 4,664,453, and assigned to the assignee of this invention describes a wheel lock control system for preventing the wheels of a vehicle from locking up while being braked. In this system, the wheel brake pressure that results in the wheel slip being substantially at the critical slip value and which produces substantially the maximum braking force between the tire and the road surface is identified. When an incipient wheel lockup condition is detected, the brake pressure so identified is then applied to the wheel brake so as to substantially continuously establish the critical slip value between the wheel and the road surface resulting in the maximum possible braking effort.

The brake pressure producing the critical slip value and therefore the maximum braking force for a vehicle wheel is identified in the above system by repeatedly calculating the tire torque tending to accelerate the wheel during braking based on an equation defining the motion of a free body consisting of the wheel, tire and the brake. This equation utilizes measured values and system constants that are based on, for example, brake lining coefficient of friction and area and wheel radius. The measured brake pressure corresponding in time to the peak calculated tire torque is stored. When an incipient wheel lockup is detected indicating that the critical wheel slip value establishing the peak braking force between the wheel and road surface has been exceeded, the stored brake pressure is the pressure producing substantially the peak braking force. After detection of an incipient wheel lockup condition, the process of identifying the brake pressure producing the peak braking force is ended and the brake pressure is dumped to allow the wheel to recover from the incipient wheel lockup condition. When recovery is sensed, the stored brake pressure producing substantially the peak braking force is reestablished to establish a braking condition in which the wheel slip is substantially at the critical slip value for the existing road-tire interface condition.

In this system, at the time the peak tire torque is detected, the stored brake pressure value corresponding in time thereto may not be precisely the value producing the peak braking force due to wheel dynamics that comprise a portion of the calculated tire torque.

SUMMARY OF THE INVENTION

The subject invention is directed toward the form of wheel lock control system as described in the aforementioned U.S. application Ser. No. 789,576. In accord with this invention, the brake pressure producing the critical slip value and therefore the peak braking effort is precisely determined. The brake pressure that is reapplied following an incipient wheel lockup condition is determined as a function of (A) the brake pressure and wheel deceleration corresponding in time to the peak calculated tire torque tending to accelerate the wheel during braking prior to the detection of an incipient wheel lockup condition and (B) the brake pressure and wheel acceleration corresponding in time to the peak calculated tire torque tending to accelerate the wheel during wheel speed recovery following an incipient wheel lockup condition. By using these parameters, the precise brake pressure for establishing the critical wheel slip is determined so that the maximum braking effort may be established following a detected incipient lockup condition.

DESCRIPTION OF THE DRAWINGS

The invention may be best understood by reference to the following description of a preferred embodiment and the drawings in which.

DESCRIPTION OF THE PREFERRED EMBODIMENT

A wheel under the influence of braking has two major torques acting on it: brake torque and tire torque. Brake torque arises from the application of brake pressure through the brake mechanism and tire torque is generated by the friction of the tire-road interface as wheel slip occurs.

Brake torque $T_b$ is assumed to be proportional to brake pressure $P_b$ with a known brake gain $K_b$ and is defined by the expression $$T_b = P_b K_b. \tag{1}$$

Tire torque $T_t$ is related to the brake friction coefficient $\mu$ between the tire and the road surface, the normal load N on the tire and the wheel rolling radius R and is defined by the expression $$T_t = \mu N R. \tag{2}$$

For the free body consisting of the brake, wheel, and tire, the equation of motion is $$I_w \dot{\omega} + T_b - T_t = 0 \tag{3}$$

where $I_w$ is the wheel moment of inertia and $\dot{\omega}$ is the rate of change in wheel speed. When the difference between the tire torque and the brake torque is positive, the wheel accelerates and when negative, the wheel decelerates. Combining expressions 1 and 3 tire torque $T_t$ is defined as $$T_t = I_w \dot{\omega} + P_b K_b. \tag{4}$$

Figure 1:
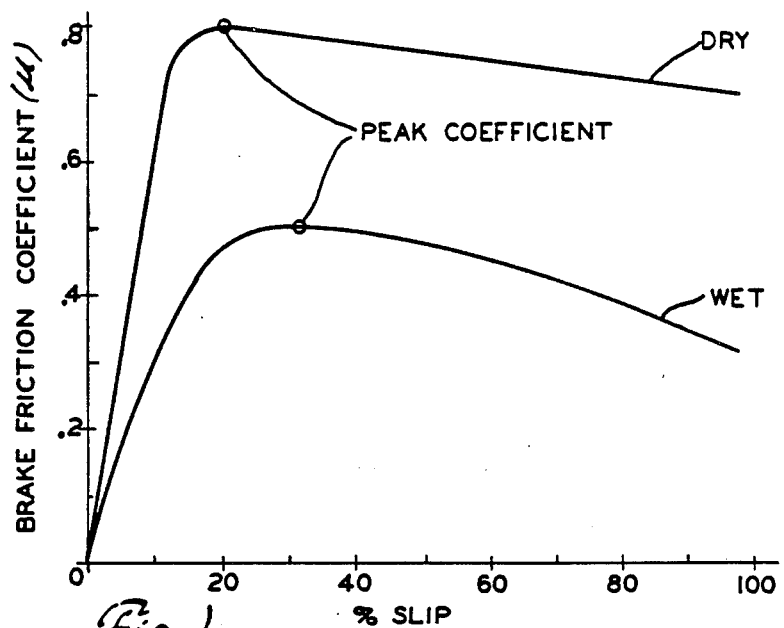
FIG. 1 is a diagram illustrating the brake force coefficient between a wheel and a road surface as a function of the percentage slip between the wheel and road surface for the road surface conditions.

The brake friction coefficient term $\mu$ of the tire torque is a nonlinear function of the magnitude of slip between the wheel and the road surface during braking and is dependent upon the road surface condition. FIG. 1 illustrates the brake friction coefficient $\mu$ as a function of percentage wheel slip for two road surface conditions. For a given road surface, it can be seen that as wheel slip is increased in response to increased brake torque $T_b$, the brake friction coefficient $\mu$ and therefore the tire torque $T_t$ increases until a critical slip value at which the brake friction coefficient and the tire torque are at a maximum. A further increase in wheel slip results in a decrease in the tire torque due to a decrease in the brake friction coefficient and high wheel deceleration values. The maximum tire torque resulting in a maximum braking effort for a given road surface is achieved when the brake torque $T_b$ produces the critical wheel slip value. When the braking effort produces a wheel slip exceeding the critical slip value, the braking operation becomes unstable and typically results in sudden wheel lockup which in turn results in increased stopping distance and a deterioration in the steering and lateral stability of the vehicle.

It can be seen from equation 4 that a given brake pressure does not result in a given tire torque due to the component of tire torque that is a function of wheel acceleration. As will be described, this invention provides for the determination of the brake pressure that produces the maximum tire torque value.

Figure 2:
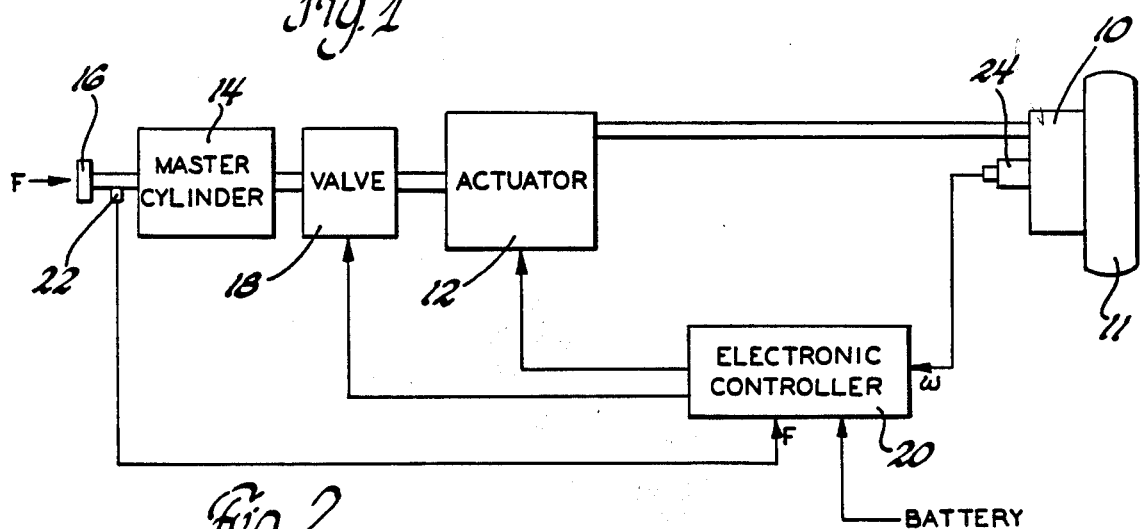
FIG. 2 is a general diagram of the braking system for controlling the brakes in accord with the principles of this invention.

A general overview of the wheel lock control system is illustrated in FIG. 2. The control of the brake of a single wheel is illustrated, it being understood that the control of the brakes of the remaining wheels of the vehicle are identical thereto. A standard wheel brake 10 for a wheel 11 is actuated by controlled hydraulic pressure from one of two sources. The primary source is a DC torque motor driven actuator 12 and the secondary source is a standard master cylinder 14 controlled directly by the vehicle brake pedal 16. A normally open electromagnetic valve 18 is energized when the actuator 12 is operative to control the hydraulic pressure to the brake 10 so as to decouple the master cylinder 14 and the brake pedal 16 from the hydraulic pressure output of the actuator 12. When the electromagnetic valve 18 is deenergized, the hydraulic pressure to the brake 10 may be modulated directly by the brake pedal 16 and the master cylinder 14.

The valve 18 is deenergized only during limited vehicle operating conditions such as during failed conditions of the primary hydraulic pressure source to permit brake pressure modulation by the master cylinder 14. At all other times, the valve 18 is energized to decouple the master cylinder 14 from the braking system.

An electronic controller 20 is responsive to the outputs of a brake pedal force sensor 22 providing a signal that is a measure of the operator applied brake pedal force F and a wheel speed sensor 24 that provides a signal that is a measure of wheel speed $\omega$. The electronic controller 20 is responsive to those signals to energize the valve 18 in the absence of a sensed failed condition of the primary hydraulic pressure source and control the hydraulic pressure applied to the wheel brake 10 via the motor controlled actuator 12.

Figure 3:
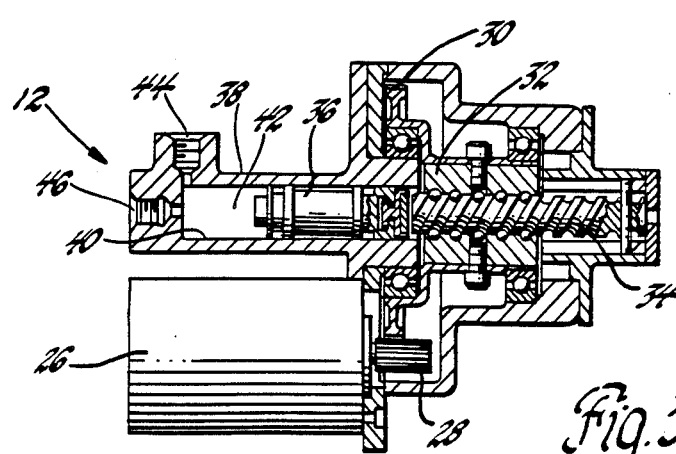
FIG. 3 is a longitudinal cross-sectional view of the actuator of FIG. 2 for modulating the brake pressure.

Referring to FIG. 3, the actuator 12 includes a DC torque motor 26 whose output shaft drives an input gear 28 which in turn rotatably drives an output gear 30. The drive member 32 of a ball screw actuator is secured for rotation with the output gear 30. The drive member 32 engages and axially positions the driven member 34 of the ball screw actuator. The driven member 34 drives a piston 36 to control the hydraulic pressure output of the actuator 12. In summary, the torque output of the motor 26 is translated into a directly related hydraulic pressure output of the actuator 12 that is applied to the respective brake of the vehicle wheels.

As more particularly illustrated in FIG. 3, the actuator 12 includes a housing 38 in which a cylinder 40 is formed. The piston 36 is reciprocally received in the cylinder 40 and defines therewith a chamber 42. The cylinder 40 has an inlet 44 operatively connected to the master cylinder 14 via the valve 18. The actuator 12 has an outlet 46 from the chamber 42 which is connected to the wheel brake 10.

In general, the electronic controller 20 identifies the value of the braking pressure $P_b$ and wheel acceleration (or deceleration) corresponding in time to the maximum tire torque $T_t$ during braking prior to a detected incipient lockup condition and during wheel speed recovery following a detected incipient lockup condition. This is accomplished by continuously estimating the tire torque value $T_t$ using equation 4 during braking and during wheel speed recovery. Any time the estimated value is larger than any previous estimated value, the values of the tire torque, the braking pressure $P_b$ and wheel acceleration are stored so that the maximum tire torque and the brake pressure and wheel acceleration or deceleration corresponding in time therewith are known. When an incipient wheel lockup is detected, the values of brake pressure and wheel deceleration corresponding in time to the maximum tire torque are retained in memory and the brake pressure is dumped to allow the wheel speed to recover. The values of brake pressure and wheel acceleration corresponding in time to the maximum tire torque during wheel speed recovery are utilized with the values in memory corresponding in time to the maximum tire torque during braking prior to the detected incipient lockup condition to determine the brake pressure that established the peak tire torque. This pressure is reapplied to the brake to establish a braking condition in which the wheel slip is at the critical slip value for the existing road surface condition.

While a pressure sensor may be utilized to measure the brake pressure applied to the wheel brake 10, this embodiment of the invention uses the terminal voltage and the current of the DC torque motor 26 of FIG. 3 as a measurement of the brake pressure. The dynamics of the DC torque motor 26 are governed by the relation $$V_m = L\, dI_m/dt + RI_m + K_T \omega_m \tag{5}$$

where $V_m$ is the motor terminal voltage, $I_m$ is the motor current, L is the motor phase winding inductance, R is the motor phase winding resistance, $K_T$ is the induced EMF or torque constant of the motor, and $\omega_m$ is the speed of the motor rotor.

The electromagnetic torque $T_m$ generated by the motor is $$T_m = K_T I_m \quad (6)$$

and is used for (A) accelerating the rotor in response to the commanded change in the brake pressure such as by the vehicle operator and (B) overcoming the brake pressure.

The portion of the motor current $I_m$ required to overcome the brake pressure is representative of the value of the brake pressure applied to the brake 10 from the actuator 12 and is used as a measure thereof. If $I_p$ is denoted for this component of the motor current, the motor torque equation can be written as $$K_T I_m = J_m d\omega_m/dt + K_T I_p \quad (7)$$

where $J_m$ is the rotor inertia.

The inductance term of equation 5 is usually very small and can be neglected. Therefore the equation 5 for the dynamics of the DC torque motor 26 may be defined as $$V_m = R I_m + K_T \omega_m. \quad (8)$$

From equation 8, the acceleration of the motor rotor can be estimated by the expression $$d\omega_m/dt = K_T^{-1} d(V_m - R I_m)/dt. \quad (9)$$

Substituting equation 9 into equation 7 yields the current component $I_p$ which is the current component associated with overcoming brake pressure as follows:

$$I_p = I_m - J_m(dV_m/dt - R \, dI_m/dt)/K_T^2. \quad (10)$$

Since this current has a value proportional to the brake pressure applied to the brake 10 from the actuator 12, it can be used as the brake pressure value of equation 4 in the estimation of the tire torque value. Substituting $I_p$ into equation 4 and letting $I_w$ equal $K_1$ yields the following equation for tire torque:

$$T_t = K_1 \dot{\omega} + K_2 I_p \quad (11)$$

where $K_2$ is a known constant relating the motor current component $I_p$ to the brake torque established by the corresponding brake pressure. The value of $K_2 I_p$ of equation 11 is equal to the value of $P_b K_b$ of equation 4.

In order to provide a measure of the value of brake pressure and to estimate the value of tire torque in accord with the equation 11, it is necessary to determine the component $I_p$ of the motor current $I_m$ associated with the application of brake pressure. During steady state braking conditions, the motor current $I_m$ is equal to $I_p$. However, during transient braking conditions, $I_p$ is determined by controlling the DC torque motor 26 by application of a controlled voltage to control the brakes. With the known value of the controlled voltage and by monitoring the current through the motor 26, the current component $I_p$ representing brake pressure can be determined in accord with equation 10.

During braking conditions where it is desirable to establish a predetermined constant brake pressure such as during wheel lock controlled braking where the brake pressure is controlled to the value establishing substantially the maximum tire torque, the DC torque motor 26 is controlled by application of a controlled current to establish the desired brake pressure and therefore operates in substantially a steady state condition. With this controlled condition, the value of $I_p$ representing the brake pressure is equal to the motor current $I_m$.

Figure 4:
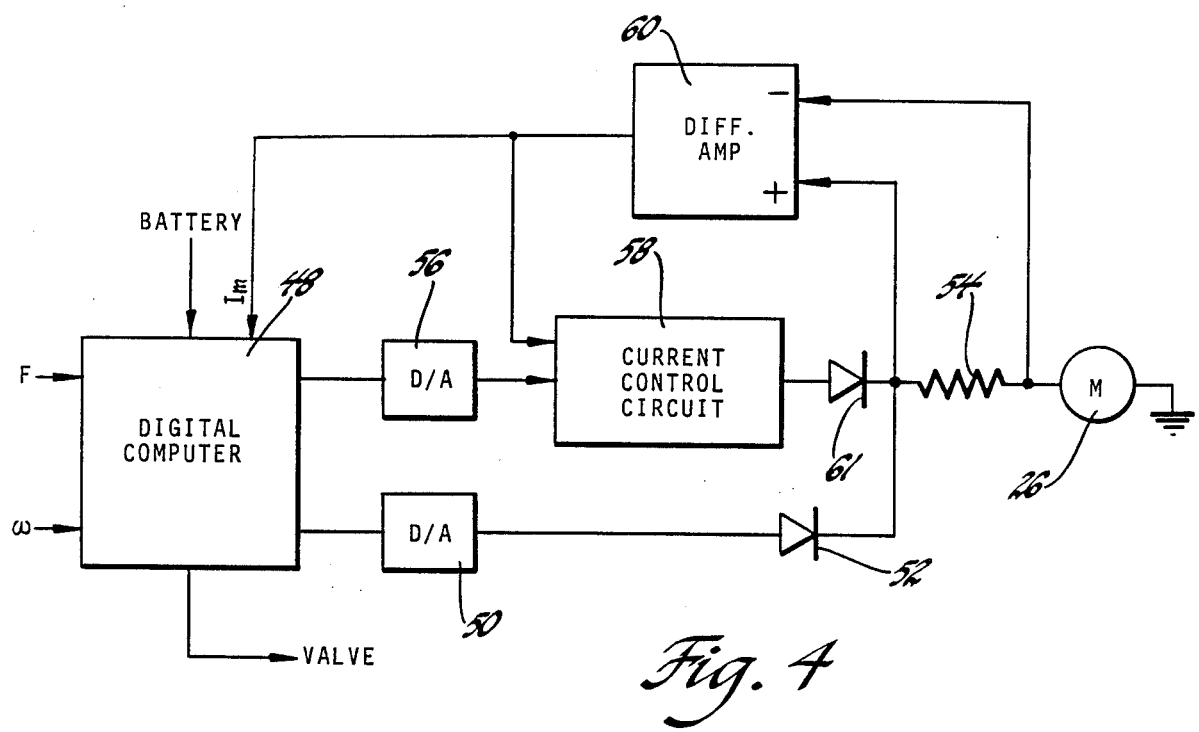
FIG. 4 is a diagram of the electronic controller for controlling the brake pressure to the wheel brakes.

The electronic controller 20 of FIG. 2 for controlling the DC torque motor 26 is illustrated in FIG. 4. The electronic controller 20 includes a digital computer 48 for controlling the torque motor 26 and the valve 18 in response to inputs including the signal F representing the operator commanded brake pressure and wheel speed $\omega$ according to an operating program permanently stored in memory. The digital computer thus includes input/output circuitry for receiving and outputting the various input and control signals and a microcomputer for processing the input signals and carrying out the control algorithm. Design details of such circuits and devices are well known to those skilled in the art of electronic controls, and are therefore not presented herein.

The digital computer 48 provides one digital output to a digital-to-analog converter 50 representing a commanded voltage to be applied to the motor 26 during a voltage control mode of operation of the actuator 12. This voltage is applied through a blocking diode 52 and a current sensing resistor 54 to the motor 26. The resistance of the current sensing resistor 54 is small so that the voltage across it is negligible as compared to the voltage across the motor 26. The digital computer 48 also provides a second digital output to a digital-to-analog converter 56 representing a commanded motor current. The analog signal representing the commanded current level is applied to a current control circuit 58 which compares the commanded motor current with the actual motor current provided by a differential amplifier 60 monitoring the voltage across the current sensing resistor 54. The current control circuit 58 may include proportional and integral control circuits which provide for establishing a current through the motor 26 as sensed by the current sensing resistor 54 at the commanded level. An isolation diode 61 is provided at the output of the current control circuit 58.

When the digital computer 48 is controlling the motor in a voltage control mode via the output of the digital-to-analog converter 50, the commanded current level applied to the digital-to-analog circuit 56 is zero resulting in a low output from the current control circuit 58. Conversely, when the motor 26 is being current controlled, the signal from the digital computer 48 to the digital-to-analog converter 50 is zero.

Figure 5:
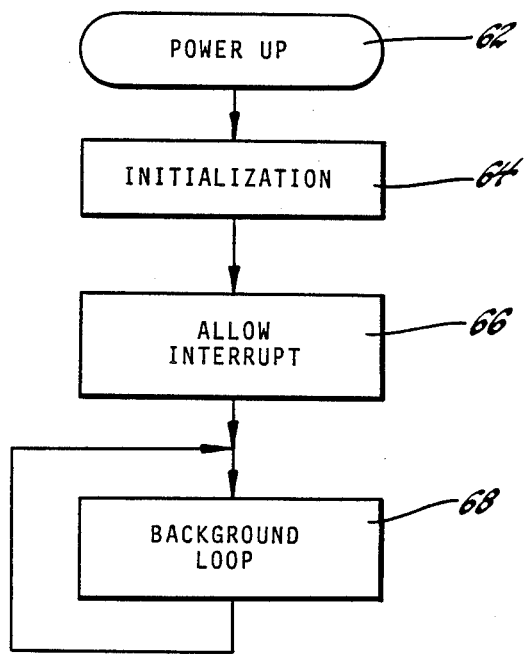
FIGS. 5 through 9 are diagrams illustrating the operation of the electronic controller of FIG. 4.

The operation of the electronic controller 20 in controlling the motor 26 to establish the braking pressure applied to the brake 10 of the wheel 11 is illustrated in the FIGS. 5-9. Referring first to FIG. 5, when power is first applied to the system such as when the vehicle switch is rotated to its ON osition, the computer program is initiated at point 62 and then proceeds to a step 64 where the computer 48 provides for system initialization. At this step, for example, initial values stored in a read only memory may be entered into random access memory locations and various counters, flags and timers may be initialized.

After the initialization step 64, the program proceeds to a step 66 where the program conditions the digital computer 48 to allow interrupts to occur and then to a background loop 68 which is continuously repeated. This loop may include, for example, diagnostic routines. In the preferred embodiment of this invention, an interrupt is provided by the digital computer 48 at 5 millisecond intervals. Following each interrupt, the execution of the background loop 68 is interrupted and the routines for controlling the actuator 12 so as to establish controlled hydraulic pressure to the brake 10 are executed.

Figure 6:
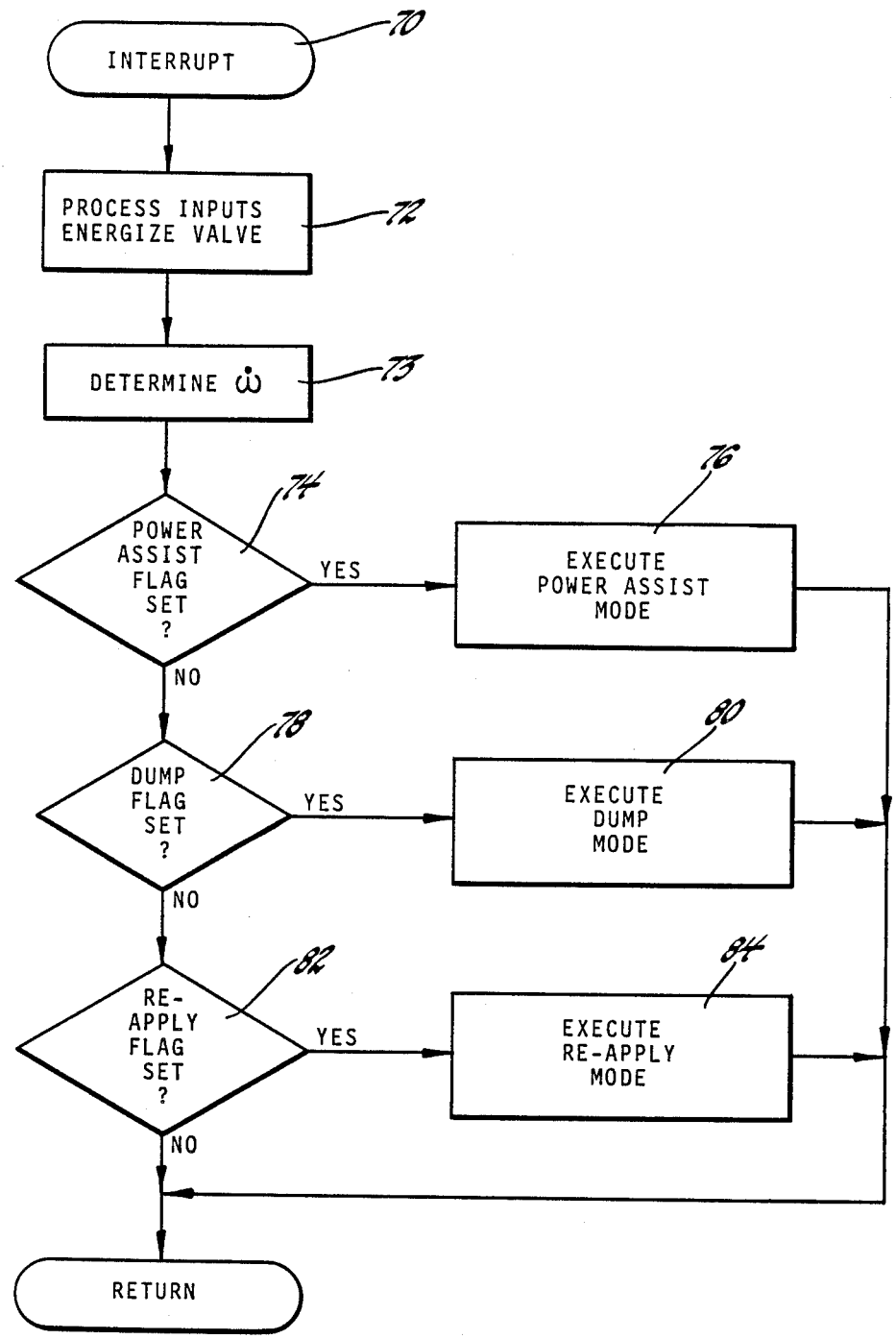

Referring to FIG. 6, the 5 millisecond interrupt routine for controlling the vehicle brake 10 via the actuator 12 is illustrated. This routine is entered at point 70 and proceeds to a step 72 where the last determined value of wheel speed ω is saved and the various inputs to the digital computer including the signal F representing the force supplied to the brake pedal 16 and the wheel speed signal ω provided by the speed sensor 24 are processed and stored. Also at this step, the valve 18 is energized. At step 73, the rate of change of wheel speed $\dot{\omega}$ is determined from the old value of wheel speed saved at step 72 and the new value stored at step 72. $\dot{\omega}$ will have a positive sign when the wheel is accelerating and a negative sign when decelerating.

From step 73, the program proceeds to a step 74 where the condition of a power assist flag is sensed. This flag is initially set during the initialization routine 64 of FIG. 5. Accordingly, the program proceeds directly to a step 76 where the program executes a power assist mode of controlling the actuator 12 whereby the terminal voltage of the DC torque motor 26 is commanded according to the foot pedal force input F as established by the vehicle driver.

During the power assist routine, the motor current $I_m$ is monitored and the component $I_p$ of the motor current that is a measure of the brake pressure applied to the brake 10 is calculated as well as the tire torque $T_t$. The value of $I_p$ and the wheel deceleration corresponding in time to the maximum calculated tire torque is stored. Following execution of the step 76, the program returns to the background loop 68. The foregoing steps of FIG. 6 are repeated until step 76 senses an impending wheel lock condition. When an impending wheel lock is detected at step 76, the power assist flag is reset and a dump flag is set to condition the program to execute a dump mode routine.

During the next execution of the interrupt routine, the program then proceeds directly from step 74 to a step 78 where the state of the dump flag is sampled. Since this flag was set at step 76, the program proceeds to execute a dump mode routine at step 80 where the brake pressure is reduced to allow the wheel speed to recover from the incipient wheel lockup condition. While the wheel speed is recovering from the incipient lockup condition, the value of tire torque is calculated and the value of the motor current representing brake pressure and the wheel acceleration corresponding in time to the maximum calculated tire torque is stored. From step 80, the program returns to the background loop 68. When the wheel speed has recovered, the dump mode routine of step 80 determines the motor current (and therefore brake pressure) that establishes the critical slip value and therefore the maximum braking effort and establishes the current through the torque motor 26 to the determined value. The routine then resets the dump flag and sets a reapply flag to condition the program to execute a reapply mode routine.

The pressure establishing the critical slip value is determined by the dump mode routine of step 80 in accord with this invention from the brake pressure and wheel deceleration corresponding in time to the peak tire torque calculated during braking prior to an incipient wheel lockup condition and the brake pressure and wheel acceleration corresponding in time to the peak tire torque calculated as the wheel speed recovers in response to the reduced brake pressure established during the dump mode routine of step 80.

During the next execution of the interrupt routine, the program proceeds from steps 74 and 78 to a step 82 where the reapply flag is sampled. Since this flag was set at step 80, the program proceeds to a step 84 where the reapply mode routine is executed.

During repeated executions of the interrupt routine, the step 84 ramps the motor current so as to increase the brake pressure applied to the brake 10. Due to the low ramping rate, the current through the motor 26 is comprised solely of the component $I_p$ representative of the brake pressure applied to the brake 10 since the current component associated with rotor dynamics is substantially zero.

During the ramping of the motor current by the reapply mode step 84, the program calculates the tire torque $T_t$ and stores the motor current $I_m$ and the wheel deceleration corresponding in time to the peak determined tire torque value in the same manner as previously described with respect to step 76. When the motor current has been ramped to a level producing a brake pressure causing an incipient lockup condition, the step 84 functions to reset the reapply flag and set the dump flag to condition the program to again execute the dump mode routine of step 80 as previously described. This cycle resulting from the slow ramping of the brake pressure provides for periodic re-identification of the pressure producing the critical slip value so as to adapt to changing road surface conditions during braking.

Whenever the reapply mode at step 84 senses that the brake pressure commanded by step 84 exceeds the brake pressure commanded by the vehicle operator, the step 84 resets the reapply flag and sets the power assist flag so that the program thereafter executes the power assist mode routine of step 76 to establish power assisted braking.

Figure 7:
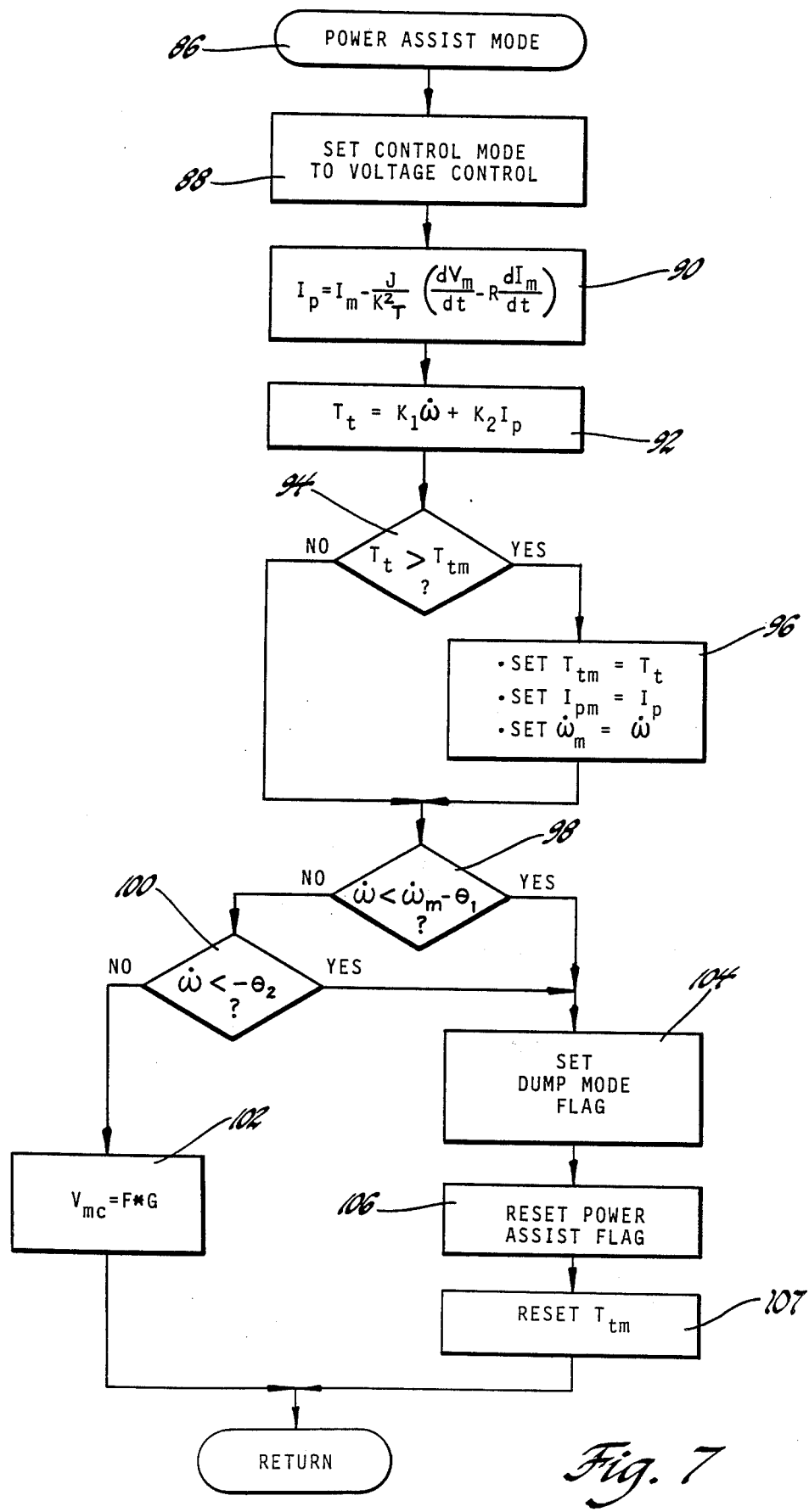
Figure 8:
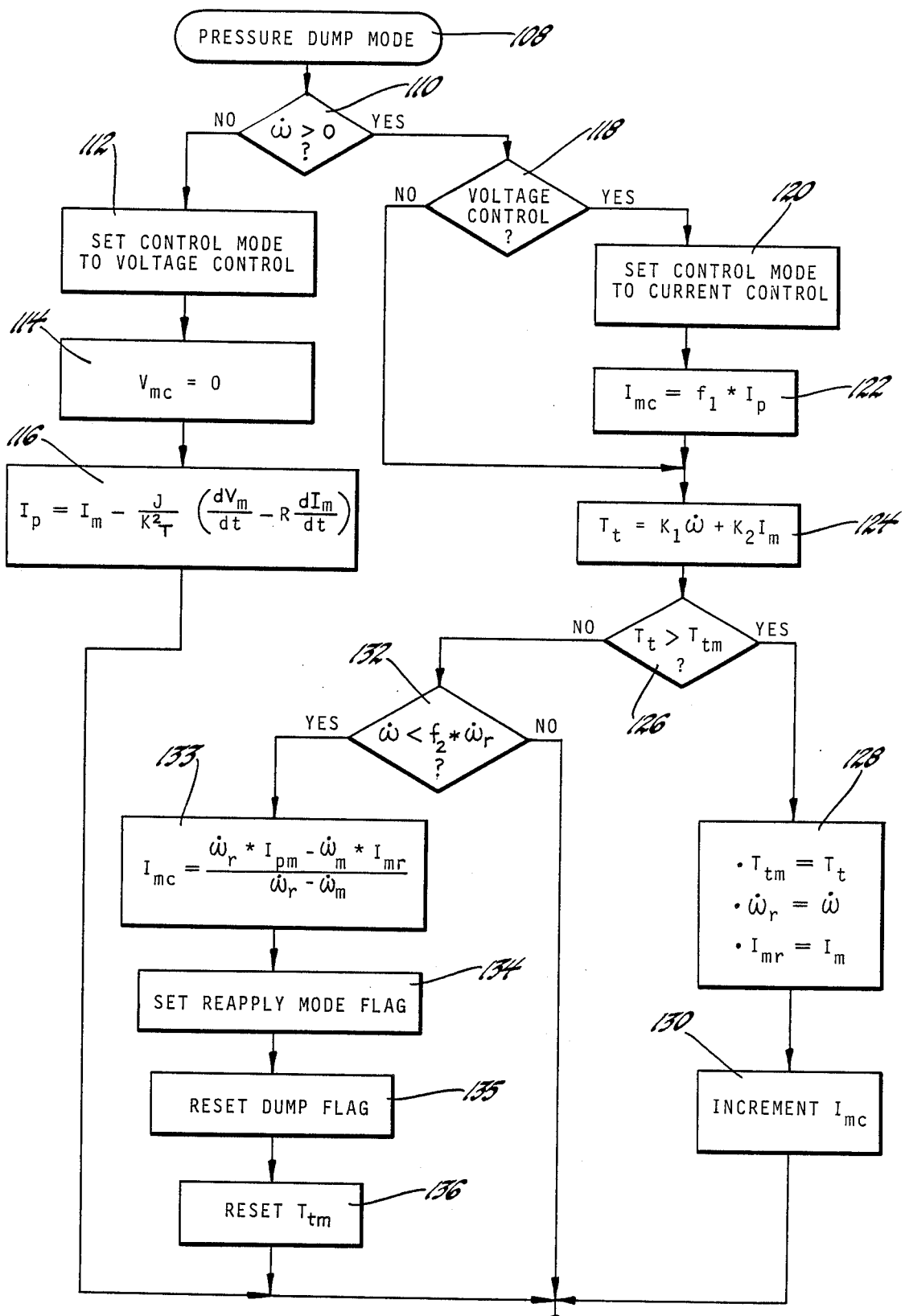
Figure 9:
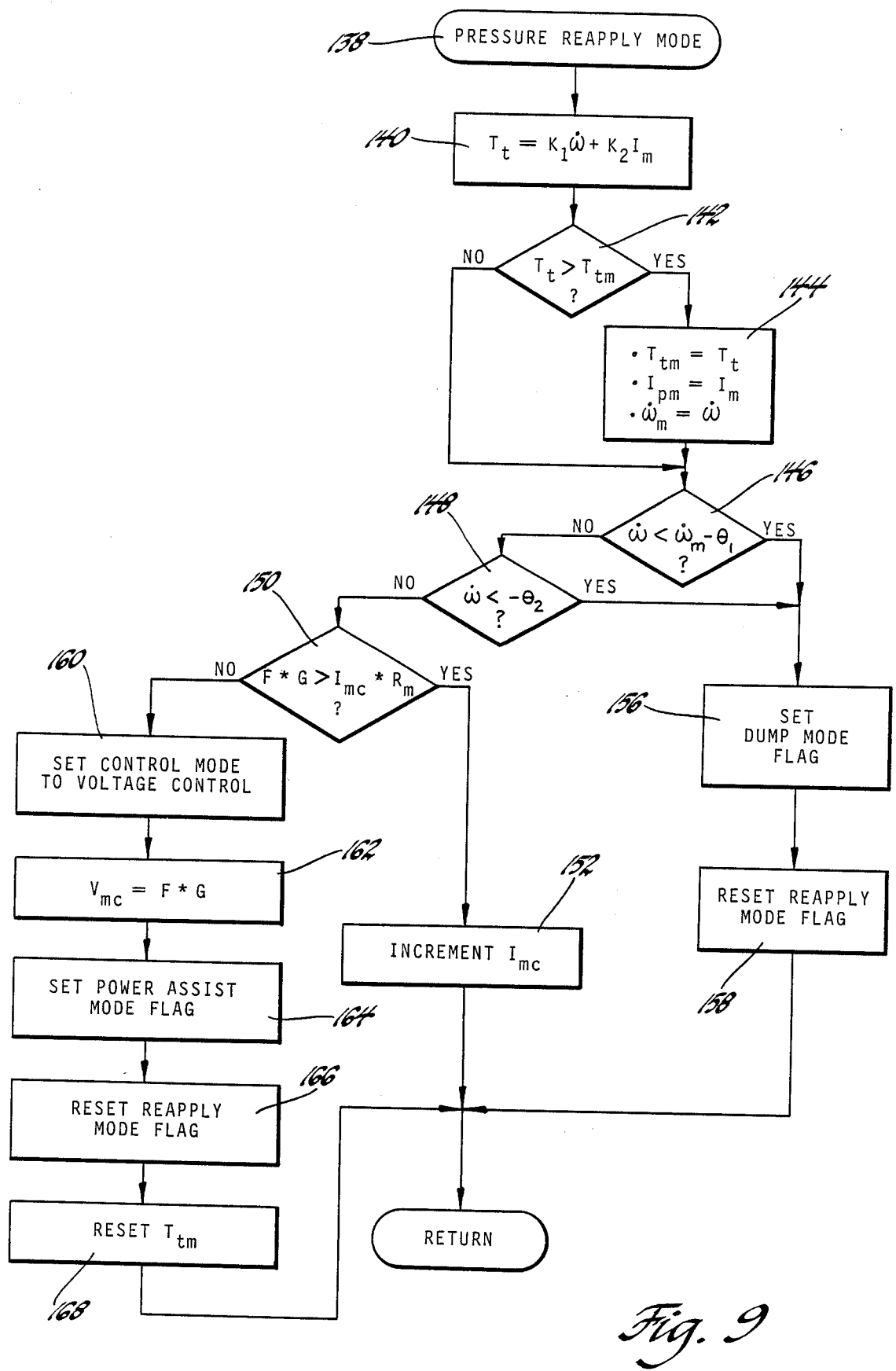

The power assist, dump and reapply modes of steps 76, 80 and 84 are illustrated in detail in FIGS. 7, 8 and 9. First referring to FIG. 7, the power assist mode of step 76 is illustrated. This mode is entered at step 86 and proceeds to a step 88 where the motor control mode is set to voltage control. When this condition exists, the commanded current output to the digital-to-analog converter 56 is set to zero.

At step 90, the program proceeds to determine the current component $I_p$ that is a measure of the brake pressure applied to the brake 10 using equation 10. From step 90, the program proceeds to a step 92 where the value of tire torque $T_t$ is calculated in accord with the equation 11 from the wheel deceleration determined at step 73 and the motor current component $I_p$ calculated at step 90.

From step 92, the program proceeds to steps 94 and 96 that function to identify the value of $I_p$ (and therefore the brake pressure) and the wheel deceleration corresponding in time to the maximum value of tire torque. At step 94, the tire torque $T_t$ calculated at step 92 is compared with the largest previously calculated value $T_{tm}$ stored in memory. If the value of $T_t$ calculated at step 92 is greater than the stored value of $T_{tm}$, the program proceeds to a step 96 where (A) the stored value of $T_{tm}$ is set equal to the larger value calculated at step 92, (B) a stored value of motor current $I_{pm}$ is set equal to the value of $I_p$ determined at step 90 and (C) a stored value of wheel deceleration $\dot{\omega}_m$ is set equal to the value determined at step 73.

The foregoing sequence of steps 94 and 96 are repeated with each execution of the power assist mode as long as the estimated tire torque determined at step 92 is increasing. If step 94 should determine that the calculated value of tire torque $T_t$ is less than the stored maximum value $T_{tm}$, step 96 is bypassed. This will occur when the brake pressure applied to the brake 10 results in a wheel slip that exceeds the critical slip value which in turn results in a decrease in the tire torque. The stored values of $I_{pm}$ and $\dot{\omega}_m$ are the values corresponding in time to the maximum braking effort whereat the wheel is at the critical slip value. The brake pressure represented by $I_{pm}$ corresponding in time to the peak tire torque during braking is not precisely the value producing the peak braking force due to wheel dynamics that comprise a portion of the calculated tire torque and therefore does not represent the brake pressure producing the critical slip value under steady state wheel speed conditions.

The program next determines whether or not an incipient wheel lock condition exists. At step 98, the program determines if the wheel deceleration is greater than the deceleration stored at step 96 by a predetermined amount $\theta_1$. This condition represents the wheel slip has exceeded the critical slip value and the wheel is decelerating toward a lockup condition. If step 98 indicates the wheel is not approaching an incipient lockup condition, the program proceeds to a step 100 where the wheel deceleration is compared to a reference value $\theta_2$ representing a high level of wheel deceleration. This value is indicative of a wheel approaching an incipient wheel lockup condition under all braking conditions.

If step 100 determines that an incipient wheel lock condition does not exist, the program proceeds to a step 102 where a motor control voltage $V_{mc}$ is set to a value equal to the operator commanded brake force F multiplied by a power assist gain value G. This value is provided to the digital-to-analog converter 50 of FIG. 4 to establish a control voltage for the motor 26 to provide for power assisted braking in accord with the operator commanded value. From step 102, the program returns to the background loop 68.

If either of the steps 98 or 100 determine that an incipient wheel lockup condition exists, the program proceeds to a step 104 where the dump mode flag is set to condition the interrupt routine to execute the dump mode routine of step 80. Thereafter at step 106, the power assist flag is reset so that the power assist mode routine of step 76 is bypassed during the subsequent executions of the interrupt routine of FIG. 6 and at step 107, the value of $T_{tm}$ is reset to zero.

The pressure dump mode of step 80 of FIG. 6 that is executed whenever an incipient wheel lockup condition is sensed is illustrated in FIG. 8. The pressure dump mode is entered at point 108 and proceed to a step 110 to determine whether or not the wheel 11 is accelerating. If the rate of change in wheel speed $\dot{\omega}$ is less than zero (negative) indicating the wheel is still decelerating after a sensed incipient lockup condition or is equal to zero, the program proceeds to a step 112 where the motor control mode is set to voltage control whereat the output of the digital computer to the digital-to-analog converter 56 is set to zero.

At step 114, the motor command voltage $V_{mc}$ provided to the digital-to-analog converter 50 is set to zero. This establishes a zero motor voltage to effect a reduction in the pressure applied to the brake 10. When the commanded motor voltage $V_{mc}$ is first set to zero, the current to the motor begins to decay resulting in a decay of the hydraulic pressure from the actuator 12 to the brake 10. The value of the component $I_p$ of the motor current that is a measure of the brake pressure applied to the brake 10 from the actuator 12 is determined at step 116 during each interrupt period while the wheel is decelerating. From step 116, the routine returns to the background loop 68.

As the motor current decays and the pressure to the brake 10 is reduced as a result, the wheel deceleration decreases until the pressure is reduced to the point where the wheel again begins to accelerate toward vehicle speed. This condition is sensed at step 110 after which the program proceeds to a step 118 where the program determines whether the motor is in a voltage control or a current control mode. If in a voltage control mode, which is the condition when wheel acceleration is first sensed during wheel speed recovery, the program proceeds to a step 120 where the control mode is set to a current control mode at which the output to the digital-to-analog converter 50 is set to zero. Thereafter at step 122, the motor command current $I_{mc}$ provided to the digital-to-analog converter 56 is set equal to a predetermined fraction $f_1$ of the value of $I_p$ last determined at step 116. This value of $I_p$ represents the brake pressure when the wheel first began to accelerate during wheel speed recovery. In one embodiment, $f_1$ is 0.75. During subsequent executions of the pressure dump mode of FIG. 8, step 118 functions to bypass the steps 120 and 122.

From step 122 during the first execution of the routine when the wheel begins to accelerate during wheel speed recovery or thereafter from step 118, the program proceeds to a step 124 where the tire torque $T_t$ during wheel speed recovery is estimated based on equation 11 in the same manner as step 92 in the power assist mode of FIG. 7. However, at step 124, the measured motor current $I_m$ is utilized in equation 11 in place of $I_p$ since as previously described $I_m$ is substantially equal to $I_p$ when the motor current is being controlled.

From step 124, the program proceeds to steps 126 and 128 that function to identify the motor current value $I_{mr}$ and wheel acceleration value $\dot{\omega}_r$ that correspond in time to the maximum value of tire torque determined at step 124 during wheel speed recovery and then to step 130 where the commanded motor current value is incremented to increase the brake pressure. From step 130, the program returns to the background loop 68.

The foregoing sequence of steps 126, 128 and 130 are repeated as long as the estimated tire torque determined at step 124 is increasing. If step 126 should determine that the calculated value of tire torque $T_t$ is less than the stored maximum value $T_{tm}$, steps 128 and 130 are bypassed. This will occur when the wheel slip decreases during wheel speed recovery to a value less than the critical slip value which in turn results in a decrease in the tire torque. The then stored values $I_{mr}$ of the motor current and $\dot{\omega}_r$ of the wheel acceleration are the values corresponding in time to the peak value of tire torque whereat the wheel is at the critical slip value. The brake pressure represented by the stored value $I_{mr}$ corresponding in time to the peak tire torque during wheel speed recovery is not precisely the value producing the peak braking force due to wheel dynamics that comprise a portion of the calculated tire torque and therefore does not represent the brake pressure producing the critical wheel slip value under steady state wheel speed conditions.

During wheel speed recovery, the wheel acceleration is a function of tire torque and therefore increases as the wheel slip decreases toward the critical slip value and will peak when wheel slip equals the critical slip value. Therefore, the value of $\dot{\omega}_r$ stored at step 128 peaks when the wheel slip becomes equal to the critical slip value.

From step 126 when the tire torque is less than the peak value as a result of wheel slip decreasing to below the critical slip value, the program proceeds to a step 132 where the wheel acceleration is compared to a predetermined fraction $f_2$ of the stored peak value $\dot{\omega}_r$. Wheel acceleration decreasing to the value specified at step 132 indicates wheel speed recovery from the incipient wheel lockup condition. In one embodiment, $f_2$ is 0.5. However in another embodiment, $f_2$ may be unity. As long as the wheel acceleration remains greater than this value, the program exits the pressure dump mode routine from step 132. However, if the wheel acceleration has decreased below the fraction $f_2$ of the maximum acceleration during wheel speed recovery, the wheel has recovered from the incipient wheel lockup condition and the program proceeds from step 132 to a step 133 where the motor command current $I_{mc}$ is set equal to a value representing the brake pressure establishing the critical wheel slip value and therefore the peak braking effort.

As previously indicated, the brake pressures represented by the values of $I_{pm}$ and $I_{mr}$ corresponding in time to the peak tire torque during brake application prior to a detected incipient wheel lockup condition and during wheel speed recovery, respectively, are not precisely the values producing the peak braking force due to wheel dynamics that comprise a portion of the calculated tire torque. Based on the stored values of brake pressure (represented by the motor current value $I_{pm}$) and wheel deceleration $\dot{\omega}_m$ corresponding in time to the peak calculated tire torque during brake application prior to a detected incipient wheel lockup condition and the stored values of brake pressure (represented by the motor current value $I_{mr}$) and wheel acceleration $\dot{\omega}_r$ corresponding in time to the peak calculated tire torque during wheel speed recovery, the step 133 determines the brake pressure in terms of the motor command current $I_{mc}$ to be reapplied to the wheel brake 10 to establish the critical slip value and therefore the maximum braking effort in accord with the expression $$I_{mc} = (\dot{\omega}_r I_{pm} - \dot{\omega}_m I_{mr})/(\dot{\omega}_r - \dot{\omega}_m). \tag{12}$$

In terms of brake pressure, this expression may be written as $$P_c = (\dot{\omega}_r P_1 - \dot{\omega}_m P_2)/(\dot{\omega}_r - \dot{\omega}_m) \tag{13}$$

where $P_c$ is the brake pressure corresponding to a motor current value $I_{mc}$ and $P_1$ and $P_2$ are brake pressures corresponding to the motor current values $I_{pm}$ and $I_{mr}$, respectively.

At step 134, the reapply mode flag is set to condition the program to execute the reapply mode routine of step 84 during the next execution of the interrupt routine. At step 135, the dump mode flag is reset so that the dump mode routine of step 80 is bypassed and at step 135, the stored value of the peak tire torque $T_{tm}$ is reset. From step 136, the program exits the pressure dump mode routine of FIG. 8.

After the dump mode routine of step 80 has sensed a wheel speed recovery from an incipient wheel lockup condition and has set the reapply mode flag, the interrupt routine of FIG. 6 executes the reapply mode routine at step 84 and which is illustrated in FIG. 9. This mode is entered at step 138 and proceeds to a step 140 where the tire torque $T_t$ is estimated based on equation 11 in the same manner as step 124 in the dump mode routine of FIG. 8.

From step 140, the program proceeds to steps 142 and 144 that function in identical manner as the steps 94 and 96 in the power assist mode to identify the brake pressure and wheel deceleration corresponding in time to the peak tire torque.

At steps 146 and 148, the program determines whether or not an incipient wheel lockup condition exists utilizing the same parameters as previously described with respect to steps 98 and 100 of the power assist mode of FIG. 7. Assuming the conditions do not represent an incipient wheel lockup condition, the program proceeds to a step 150 where the operator commanded braking effort represented by a motor terminal voltage equal to F*G is compared to the braking effort represented by the motor terminal voltage established by the motor current command value $I_{mc}$ times the motor winding resistance R. If the braking force established by the motor current $I_{mc}$ is less than the operator commanded braking effort, indicating controlled braking in response to an incipient wheel lockup condition, the program proceeds to a step 152 where the motor current command value $I_{mc}$ is incremented. Following step 154, the program returns to the background loop 68 of FIG. 5.

During the following executions of the interrupt routine, the step 152 of FIG. 9 functions to ramp the commanded motor current to ramp the brake pressure applied to the brake 10 by the actuator 12. When the brake pressure is ramped to a level producing an incipient wheel lockup condition as sensed by step 146 or step 148, the steps 142 and 144 have again identified the motor current component $I_{pm}$ and wheel deceleration $\dot{\omega}_m$ corresponding in time to the maximum tire torque value. When an incipient wheel lockup condition is sensed, the program proceeds to a step 156 where the dump mode flag is set to condition the program to again execute the pressure dump mode routine of FIG. 8 to dump brake pressure to allow wheel speed recovery from the incipient wheel lockup condition. At step 158, the reapply mode flag is reset after which the program returns to the background loop 68.

During the next executions of the interrupt routine, the pressure dump mode routine of FIG. 8 is again executed as previously described. The foregoing cycle is continuously repeated until such time that the program senses at step 150 an operator requested braking effort that is less than the braking effort established by the motor command current $I_{mc}$. At this time, the program proceeds from step 150 to a step 160 where the motor control mode is set to voltage control. At step 162, the program commands a motor control voltage $V_{mc}$ equal to the operator commanded brake force F times the power assist gain G to provide for normal power assisted braking.

At step 164, the power assist mode flag is set to condition the program to execute the power assist mode routine of FIG. 7 previously described. At step 166, the program resets the reapply mode flag. Thereafter, at step 168, the value of the maximum tire torque $T_{tm}$ is reset after which the program returns to the background loop 68.

The foregoing routines provide for reapplying a braking pressure to the wheel brake 10 by the actuator 12 having a value producing the critical slip value and therefore the maximum tire torque during wheel lock controlled braking.

The foregoing description of the preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A method of limiting the brake pressure applied to the brake of a vehicle wheel, the method comprising the steps of:
    determining the brake pressure applied to the brake;
    determining the rate of change in wheel speed;
    determining the maximum tire torque tending to accelerate the wheel during each period of application of brake pressure;
    storing the determined brake pressure and the determined rate of change in wheel speed corressponding in time to the determined maximum tire torque during each period of application of brake pressure;
    detecting an incipient wheel lockup condition;
    reducing the brake pressure in response to a detected incipient wheel lockup condition to allow wheel speed recovery;
    determining the maximum tire torque tending to accelerate the wheel during wheel speed recovery following each reduction of brake pressure in response to a sensed incipient wheel lockup condition;
    storing the determined brake pressure and the determined rate of change in wheel speed corresponding in time to the determined maximum tire torque during wheel speed recovery following each reduction of brake pressure in response to a detected incipient wheel lockup condition; and
    applying brake pressure to the brake following wheel speed recovery with a value that is a predetermined function of the stored brake pressure and rate of change in wheel speed during the period of application of brake pressure prior to a detected incipient wheel lockup condition and the stored brake pressure and rate of change in wheel speed during wheel speed recovery after the detected incipient wheel lockup condition.

2. A wheel lock control system for limiting the brake pressure applied to the brake of vehicle wheel, the system comprising:
    means for sensing wheel speed and
    control means, the control means including
    means for determining the brake pressure applied to the brake,
    means for determining the rate of change in the sensed wheel speed,
    means for detecting an incipient wheel lockup condition,
    means for reducing the brake pressure in response to a detected incipient wheel lockup condition to allow wheel speed recovery,
    means for determining the maximum tire torque tending to accelerate the wheel (A) during each period of application of brake pressure prior to a detected incipient wheel lockup condition and (B) during wheel speed recovery following each reduction of brake pressure in response to a detected incipient wheel lockup condition,
    means for storing the determined the brake pressure and the determined rate of change in wheel speed corresponding in time to the determined maximum tire torque during each period of application of brake pressure prior to a detected incipient wheel lockup condition,
    means for storing the determined brake pressure and the determined rate of change in wheel speed corresponding in time to the determined maximum tire torque during wheel speed recovery following each reduction of brake pressure in response to a detected incipient wheel lockup condition and
    means for applying brake pressure to the brake following wheel speed recovery with a value that is a predetermined function of the stored brake pressure and rate of change in wheel speed during the period of application of brake pressure prior to a detected incipient wheel lockup condition and the stored brake pressure and rate of change in wheel speed during wheel speed recovery after the detected incipient wheel lockup condition.

3. A wheel lock control system for limiting the brake pressure applied to the brake of a vehicle wheel, the system comprising:
    means for sensing wheel speed and
    control means, the control means including
    means for determining the brake pressure applied to the brake,
    means for determining the rate of change $\dot{\omega}$ in the sensed wheel speed,
    means for detecting an incipient wheel lockup condition,
    means for reducing the brake pressure in response to a detected incipient wheel lockup condition to allow wheel speed recovery,
    means for determining the maximum value of tire torque $T_t$ tending to accelerate the wheel (A) during each period of application of brake pressure prior to a detected incipient wheel lockup condition and (B) during wheel speed recovery following each reduction of brake pressure in response to a detected incipient wheel lockup condition,
    means for storing a brake pressure value $P_1$ of the determined brake pressure and a rate of change value $\dot{\omega}_m$ in the determined rate of change in wheel speed corresponding in time to the determined maximum tire torque during each period of application of brake presusre prior to a detected incipient wheel lockup condition,
    means for storing a brake pressure value $P_2$ and a rate of change value $\dot{\omega}_r$ in the determined rate of change in wheel speed corresponding in time at the determined maximum tire torque during wheel speed recovery following each reduction of brake pressure in response to a sensed incipient wheel lockup condition and means for applying brake pressure to the brake following wheel speed recovery with a value $P_c$ defined by the expression $P_c = (\dot{\omega}_r P_1 - \dot{\omega}_m P_2)/(\dot{\omega}_r - \dot{\omega}_m)$.

4. The wheel lock control system of claim 3 wherein $T_t$ is defined by the expression $T_t = I_w \dot{\omega} + P_b K_b$ where $I_w$ and $K_b$ are predetermined constants and $P_b$ is the brake pressure.

* * * * *